US005355387A

United States Patent [19]
English, Jr. et al.

[11] Patent Number: 5,355,387
[45] Date of Patent: Oct. 11, 1994

[54] INTERFACE MODULE FOR TRANSVERSE ENERGY INPUT TO DYE LASER MODULES

[75] Inventors: Ronald E. English, Jr.; Steve A. Johnson, both of Tracy, Calif.

[73] Assignee: The United States of America as represented by the United States Department of Energy, Washington, D.C.

[21] Appl. No.: 194,786

[22] Filed: Feb. 10, 1994

Related U.S. Application Data

[63] Continuation of Ser. No. 915,796, Jul. 14, 1992, abandoned.

[51] Int. Cl.$^5$ ............................................. H01S 3/20
[52] U.S. Cl. ............................................. 372/54; 372/6; 372/69; 372/92; 372/83; 372/101
[58] Field of Search ............ 372/54, 95, 83, 6, 69, 372/98, 70, 53, 101, 92

[56] References Cited

U.S. PATENT DOCUMENTS

| | | | |
|---|---|---|---|
| 4,383,318 | 5/1983 | Barry et al. | 372/70 |
| 4,627,068 | 12/1986 | Johnson et al. | 372/54 |
| 4,710,940 | 12/1987 | Sires, Jr. | 372/69 |
| 4,713,822 | 12/1987 | Lee | 372/6 |
| 4,890,289 | 12/1989 | Basu et al. | 372/6 |
| 4,974,230 | 11/1990 | Hemmati | 372/75 |

*Primary Examiner*—Léon Scott, Jr.
*Attorney, Agent, or Firm*—Miguel A. Valdes; Roger S. Gaither; William R. Moser

[57] ABSTRACT

An interface module (10) for transverse energy input to dye laser modules is provided particularly for the purpose of delivering enhancing transverse energy beams (36) in the form of illumination bar (54) to the lasing zone (18) of a dye laser device, in particular to a dye laser amplifier (12). The preferred interface module (10) includes an optical fiber array (30) having a plurality of optical fibers (38) arrayed in a co-planar fashion with their distal ends (44) receiving coherent laser energy from an enhancing laser source (46), and their proximal ends (4) delivered into a relay structure (3). The proximal ends (42) of the optical fibers (38) are arrayed so as to be coplanar and to be aimed generally at a common point. The transverse energy beam array (36) delivered from the optical fiber array (30) is acted upon by an optical element array (34) to produce an illumination bar (54) which has a cross section in the form of a elongated rectangle at the position of the lasing window (18). The illumination bar (54) is selected to have substantially uniform intensity throughout.

20 Claims, 3 Drawing Sheets

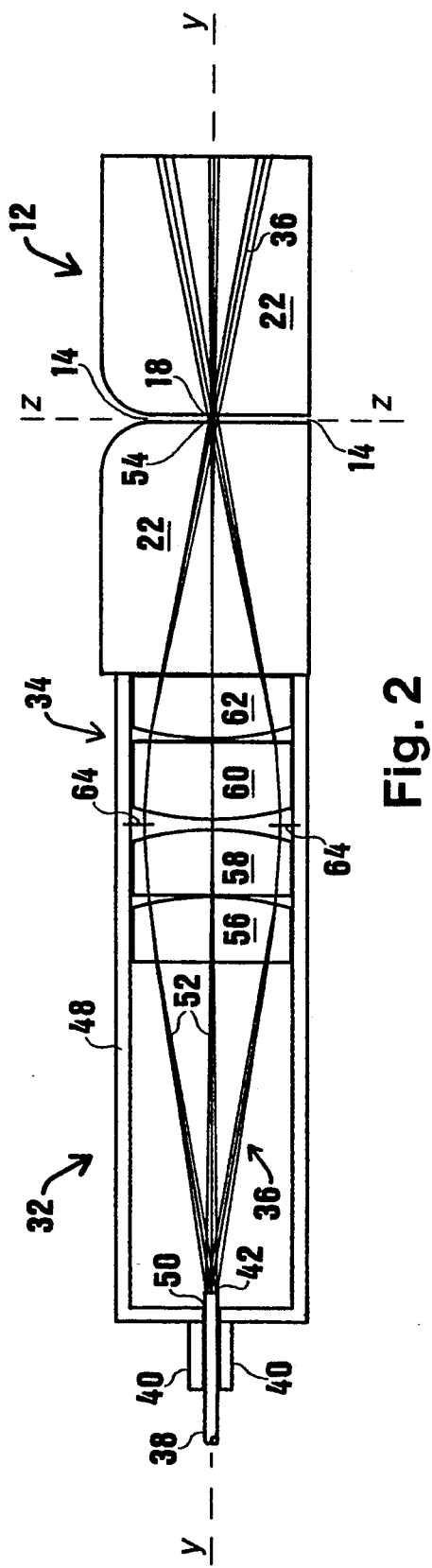
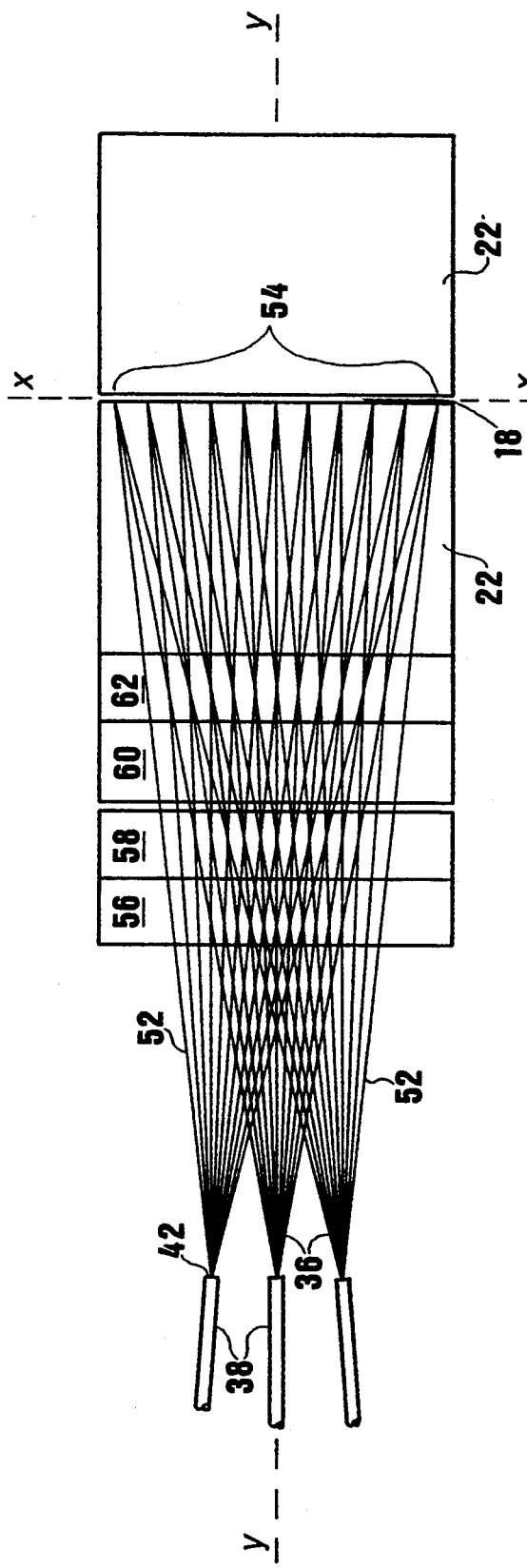
Fig. 2
Fig. 3

INTERFACE MODULE FOR TRANSVERSE ENERGY INPUT TO DYE LASER MODULES

BACKGROUND OF THE INVENTION

The invention herein arose in the course of, or under, contract Number W-7405-ENG-48 between the United States Department of Energy and the University of California for the operation of the Lawrence/Livermore National Laboratory.

This is a continuation of application Ser. No. 07/915,796 filed Jul. 14, 1992 and now abandoned.

The present invention relates generally to the field of lasers and more particularly to a system for enhancing the output of a dye laser or dye laser amplifier by delivering transverse electromagnetic energy for the purposes of exciting the molecules of a flowing dye stream within a dye cell. The predominant current usage of the present invention is in amplification modules which may be serially utilized to increase the power of a dye laser output.

A class of laser devices which is particularly useful within a variety of applications is known as a dye laser. The dye type laser utilizes a rapidly moving stream of dye materials (typically Rhodamine GC class dyes, dissolved in alcohol, although the precise nature of the dye is not significant to the present invention). These may either be original excitation lasers, or amplification laser elements used in series with a dye laser and other amplifiers. In an amplifier, a laser beam component, referred to herein as an axial beam, is delivered to a window chamber within which the dye material is flowing. The axial beam (which is also referred to in the field as the "seed" beam) illuminates a portion of the dye flow, the illuminated portion having the same shape as that of the axial beam, which is defined by the shapes of the windows and the operations of the optics. In most embodiments the "lasing" zone is defined by the overlap of the dye stream and the axial beam, this zone being an elongated rectangle in overall shape.

One phenomenon which has been observed with dye lasers is that the performance of the dye laser series can be enhanced by utilizing the amplifiers to deliver additional electromagnetic energy to the dye within the lasing zone in a transverse manner to the axial beam. The excitation from the transverse beam causes the individual molecules within the dye to become excited and upon decay from an excited state to an unexcited state, to emit additional electromagnetic energy in the same frequency and direction as the axial beam. The actual "lasing" of the dye particles is caused by the transverse energy input. This results in an enhanced power output from that which can be obtained from utilizing an unaided laser, such as that utilized to produce the original axial beam. Without the presence of the axial beam, the energy emitted from the dye molecules excited by the enhancement beam would be randomly directed. However, the axial beam (seed light) causes this emitted energy to become aligned.

One of the inventors, Steve A. Johnson, has previously been named as a coinventor on U.S. Pat. No. 4,627,068, for a method of enhancing the output for dye laser oscillators. The Johnson patent describes in detail some of the operation of the dye laser and the associated optics and is incorporated by reference herein for the purposes of setting forth some of the background of the present invention and for that portion of its teaching which is relevant to enabling the teaching of the present disclosure.

One feature which is a limiting factor to the degree of enhancement which may be effectively delivered to the dye stream is that the zone which is to be illuminated by the transverse enhancement beam, for best effect, should be the same as the zone of dye illuminated by the axial beam (the "lasing zone"). For maximum efficiency it is desirable that essentially all of the energy input from the enhancement beam be delivered to this lasing zone in such a manner that maximum dye molecule excitation and consequent lasing is achieved. Since the effective transverse cross section of the lasing zone is an elongated rectangle, it is desirable to deliver a relatively uniform distribution of energy from the transverse energy delivery module to the lasing zone in order to achieve maximum efficiency. This purpose was an object of the earlier Johnson patent, which is also addressed by the present invention.

Various limitations occur in the structure taught in the Johnson disclosure resulting from a single optical fiber being utilized to deliver transverse energy to an amplifier chamber which utilizes optical elements to focus the energy into the desired window. Although the usage of a single fiber results in straightforward optical arrangements, the amount of energy delivered to the lasing zone is limited by the capacity of the fiber and also by the limitation upon the enhancement laser which delivers energy to the fiber. In addition, shaping the output of a single fiber into a elongated rectangular window can result in substantial nonuniformity of energy delivery within that window.

Accordingly, since it is desirable to obtain greater energy delivery to the lasing zone in a transverse manner and also to obtain more uniform energy distribution within the lasing window, it is desirable to develop enhanced transverse energy delivery techniques to maximize the output of the dye laser system.

SUMMARY OF THE INVENTION

Accordingly, it is an object of the present invention to deliver a greater amount of transverse electromagnetic energy to a dye laser lasing zone than is feasible utilizing prior art techniques.

It is another object of the present invention to deliver transverse energy to the lasing zone of a dye laser component in the form of a segment of focused light energy (three dimensional) in the form of an illumination bar having substantial intensity uniformity and being positioned and focused to overlap the dye stream within the elongated rectangular lasing zone.

It is a further object of the present invention to utilize multiple fiber optic energy inputs conjunctively delivered into an interface relay.

It is still another object of the present invention to optically shape the input of multiple enhancing lasers into an illumination bar having its maximum concentration coinciding with the lasing zone.

It is a still further object of the present invention to capture nearly all of the output of a plurality of enhancement lasers and deliver such output to the dye laser lasing window.

Briefly, the preferred embodiment of the present invention is an interface module for transverse energy input to dye laser module. The primary preferred embodiment is known as a fiber to amplifier relay module (FTAR) for use in enhancing the power output of a dye laser amplifier. The dye laser amplifier is utilized to take the axial beam output of a previous laser and to amplify the power into an amplified axial output beam. The transverse energy delivered to the lasing zone of the amplifier by the interface module of the present invention results in greater power existing in the output beam.

The preferred embodiment interface module utilizes a plurality of optical Fibers arrayed in a coplanar fashion (in the x-y plane) with the axial beam which is being amplified by the dye laser amplifier. The proximal ends of the optical fibers are held in a mounting plate structure to enter a relay structure with the proximal ends of the fibers directed such that their axes are aimed at a common point. An optical element array is provided within the relay structure to shape the joint outputs of all of the optical fibers into a focused and positioned combination beam. A particular three dimensional segment of this combination beam is referred to here as an illumination bar. The illumination bar segment is relatively uniform in intensity and shape in a rectangular sol id volume, and, when properly focused and positioned, has its maximum intensity coinciding with the lasing zone. The mounting and relay structures of the preferred embodiment are adapted to operate with a fiber array including up to eighteen (18) coplanar individual optical fibers although this number is limited only by existing structures not by theory. In addition, two interface modules may be utilized with a single dye laser amplifier to deliver transverse radiation energy to the lasing zone from two sides simultaneously, for maximum enhancement.

An advantage of the present invention is that it efficiently concentrates the output of a plurality of enhancement beam creation lasers into a single illumination bar which maximizes the amplification provided by dye laser amplifier.

It is another advantage of the present invention that the illumination bar provided by the optical elements is relatively uniform in shape and in illumination intensity within the transverse cross sectional shape.

It is a further advantage of the present invention that the incoming energy from the fiber her optic array is directed within a common plane toward a common point so as to minimize the necessary complexity of the optical element array.

It is yet another advantage of the present invention that it results in an amplified axial beam output from the dye laser amplifier which has a maximum effective output power for the input power level.

These and other objects and advantages of the present invention will become clear to those skilled in the art in view of the description of the best presently known modes for carrying out the invention and the industrial applicability of the preferred embodiment as described herein and as illustrated in the several figures of the drawing.

BRIEF DESCRIPTION OF THE DRAWINGS

FIG. 2 is a cross-sectional view taken along the Y-Z axes of an alternate embodiment of the present invention, being simplified version of the embodiment illustrated in FIG 1;

FIG. 3 is an X-Y plane cross-sectional fanciful view of the relay structure of FIG. 2;

DETAILED DESCRIPTION OF THE INVENTION

Figure 1:
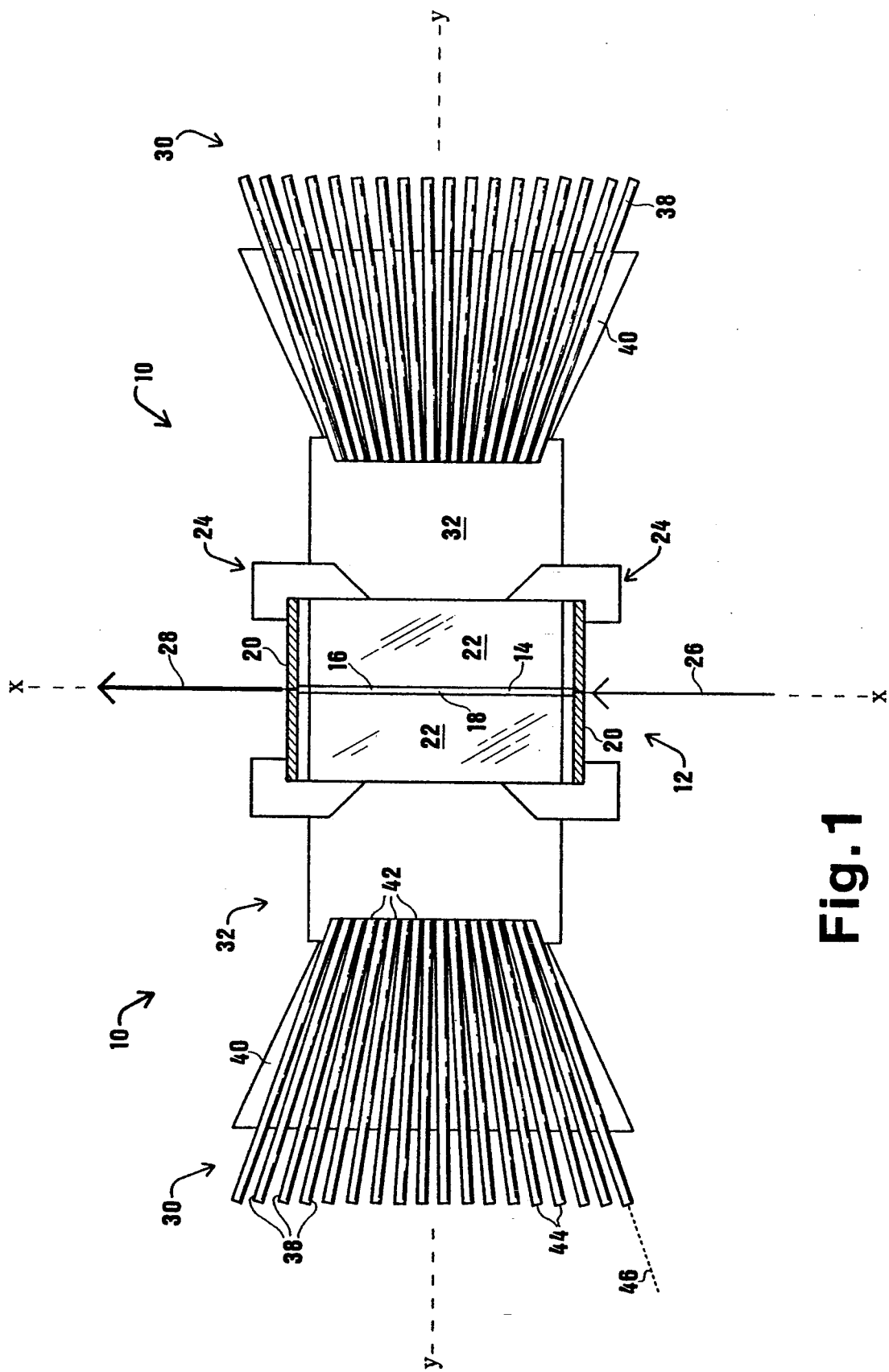
FIG. 1 is a partially cut away top plan view of a preferred embodiment of the present invention, showing two of the interface modules of the present invention mounted upon a single dye laser amplifier.

The best presently known mode for carrying out the invention is an interface module for transverse energy input to dye laser modules. A preferred embodiment of the invention is a fiber to amplifier relay device (FTAR) interface module illustrated in a partially cut away top plan view in FIG. 1 and is designated by the general reference character 10. In illustration of FIG. 1, two substantially identical interface modules 10 are shown as mounted upon a single dye laser amplifier 12. The illustration of FIG. 1 shows the X and Y axes of the structure as being in the plane of the paper while the Z axis is orthogonal to the X and Y axes. The orientation of FIG. 1 is contra-intuitive in that the X axis appears in the vertical direction on the illustration while the Y axis is horizontal. This rotated orientation is utilized to illustrate the structure of the invention and also to correspond to the commonly utilized term "transverse" to refer to the energy delivered to the dye laser amplifier 12 from the interface module 10.

Although it is a conventional structure which does not directly form a portion of the invention, the dye laser amplifier 12 represents the typical component with which the interface module 10 of the present invention is intended to be used. The dye laser amplifier 12 illustrated in FIG. 1 utilizes a dye stream 14 which is induce to flow under high pressure along a path corresponding the Z axis through a flow chamber 16 within the amplifier 12. A lasing zone 18 is situated within the flow chamber 16 and is bounded on each end, along the X axis, by an end window 20 and on each side, in the Y direction, by a transverse window 22. The integrity of the structures of the dye laser amplifier 12 and the positioning of the end windows 20 and the transverse windows 22 is maintained by an amplifier housing 24 (which is much more massive and complex in use than that illustrated in FIG. 1).

The operation of the dye laser amplifier 12 is for the purpose of operating upon an initial axial beam 26 to create an amplified axial beam 28. The initial axial beam 26, delivered along the X axis, is a coherent laser beam. The initial axial beam 26 is typically the output of a serially arrayed dye laser or dye laser-dye laser amplifier combination. By interfacing the initial axial beam 26 with the dye stream 14 within the lasing zone 18, the output represented by the amplified axial beam 28 is modified such that the amplified axial beam 28 has a higher power than the initial axial beam 26. A variety of factors affect the gain from the initial axial beam 26 to the amplified beam 28, but one of the important factors is the power of the transverse energy delivered to the dye stream 14 within the lasing zone 18 by the interface module 10 of the present invention. Although the relationship between the power of the transverse energy and the gain is not strictly linear, a clearly dependent relationship exists.

The two interface modules 10 illustrated in FIG. 1 are substantially identical in structure and are generally laterally symmetrical about the Y axis, as illustrated. Each interface module 10 includes a fiber array 30, a relay structure 32, and an optical element array 34 (illustrated in FIGS. 2 through 5), all of which are for the purpose of creating and shaping a transverse energy beam array 36 (also illustrated in FIGS. 2 through 5). The purpose of the interface module 10 is to deliver the transverse energy beam array 36 in a concentrated form to the lasing zone 18 such that the excitation of the molecules within the dye stream 14 is maximized and that the gain observed in the amplified axial beam 28, as compared to the initial axial beam 26, is optimized.

The subassembly of the interface module 10 which is best illustrated in FIG. 1 is the fiber array 30. In this illustration it may be seem that the fiber array 30 is made up of a plurality of individual optical fibers 38 which are held in a converging array between a pair of mounting plates 40. In the illustration of FIG. 1 only the bottom mounting plate 40 is illustrated, with the top mounting plate being removed in order to show the converging pattern of the optical fibers 38.

Each of the optical fibers 30 includes a proximal end 42 which enters the relay structure 32 and delivers energy thereinto, and a distal end 44. The distal ends 44 of the optical fibers 38 are not actually shown in the drawing but extend well beyond the boundaries of FIG. 1. Each distal end 44 is associated with an enhancing laser energy source 46 (not shown). The enhancing laser sources 46 are typically laser devices such as copper vapor lasers which deliver their output into the distal ends 44 of an associated optical fiber 38 for delivery to the interface module 10. This is accomplished in much the same manner as is illustrated in the Johnson patent, U.S. Pat. No. 4,627,068.

As is shown in FIG. 1, the mounting plates 40 are trapezoidal in shape and are utilized to mount the optical fibers 38 into a converging array such that the proximal ends 42 of the optical fibers 38 are delivered to the relay structure 32 in a coplanar array with the proximal ends 42 tightly packed and with their output directed in a converging pattern toward a common point. This sort of mounting can be best accomplished by precutting grooves within the mounting plates 40 to prevent the fibers 38 from losing alignment.

In the illustration of FIG. 1, the optical fiber array 30 is shown as including eighteen (18) converging optical fibers 38. It has been empirically determined that this is a practical maximum for the number of optical fibers which can be utilized given currently available materials and techniques. There is no theoretical limit, even for a coplanar array of this type, but the physical limitations of the present equipment result in the preferred array 30 illustrated. In order to utilize the optical element array 34 to best effect, it is desirable that the outermost optical fibers 38 be arrayed so as to be angled at no greater than twenty degrees (20°), relative to each other. Given this limitation, and the physical limitations required by the diameter of the optical fibers 38, the eighteen fiber array illustrated in FIG. 1 represents the maximum coplanar array 30 available to the inventors at this time. However, it is understood that improved techniques and materials may result in a more concentrated fiber arrays 30 being feasible. Additionally, a larger dye laser amplifier than that shown as 12 could accommodate a larger relay structure and a greater number of fibers 38. Of course, optical arrays 30 having a smaller number of fibers may also be utilized for those situations where the maximum concentration of transverse energy is not necessary or cost effective.

One such simpler optical fiber array 30 is illustrated in FIGS. 2 and 3. The drawings of FIGS. 2 and 3 are presented in order to show the relay structure 32 and the optical element array 34. The effect of these components on the transverse energy beam 36 in the vertical y-z plane is particularly illustrated.

In the illustration of FIG. 2, particularly, it may be seen that the dye laser amplifier 12 is arranged such that the flow path of the dye stream 14 is along the Z axis with the lasing zone 18 situated on the X and Y axes, as defined for the purposes of this application. It may be noted from this illustration that the transverse windows 22 of the dye laser amplifier 12 are very thick in nature to withstand the high pressure involved and also are tapered in the direction of incoming flow of the dye stream 14. The tapering or beveling of the transverse windows 22 results in a smooth flow path of the dye stream 14 through the flow chamber 16.

With respect to the fiber array 30 illustrated in FIG. 2, it may be seen that a specific optical fiber 38 is illustrated as entering into the relay structure 32. Since the individual fibers 38 in the fiber array 30 are arranged to be coplanar in the x-y plane, the illustration of FIG. 2 applies to each fiber 38 equally. No specific fiber was selected for this view. The relay structure 32 includes a relay housing 48 which encloses the optical element array 34. The relay housing 48 includes a fiber aperture 50 associated with each of the optical fibers 38 which are delivered into the relay structure 32. The mounting plates 40 and the fiber apertures 50 hold the proximal fiber ends 42 in position and orientation. The relay housing 48 serves to prevent the escape of the high power laser energy to the surrounding environment. Further, the relay housing 48 must be able to provide positional support for each of the elements of the optical element array 34, but its precise structure is otherwise not critical to the operation of the invention. Accordingly, it is illustrated only in FIG. 2 and not in the remaining figures.

In this illustration it may seen that the purpose of the relay 32 is to shape and direct the transverse energy beam array 36 for maximum results. The output for each of the optical fibers 38 may be represented as a plurality of example electromagnetic rays 52. A selected few example electromagnetic rays 52 are illustrated in FIG. 2 to show the manner in which the individual example rays 52 are modified by the optical element array 34. For the purposes of illustration, only the outermost significant example rays 52 and the center rays are illustrated for each fiber 38 shown in the drawing. In this illustration it may be seen that each of these example rays 52 is shaped by the optical element array 34, within the Y-Z plane, to form a concentrated and focused illumination bar 54, which is a three dimensional segment of the energy beam having relatively uniform illumination in a rectangular solid shaped zone. When properly positioned and focused, the illumination bar 54 has its maximum concentration coinciding with the location of the lasing zone 18. The illumination bar 54 has a width (in the Z direction) which is equivalent to the width of the lasing zone 18 with the relative intensity of the transverse energy beam 36 being approximately equal throughout.

The optical element array 34 illustrated in FIG. 2 includes a variety of specific optical elements utilized for the purpose of forming the illumination bar 54. The components and spacing of the various optical elements are determined by conventional optical techniques and those skilled in the art will readily be capable of modifying the particular configuration shown in order to deal with special circumstances.

The output of each optical fiber 38, while relatively coherent, is subject to a certain amount of spreading. The example rays 52 illustrated in FIG. 2 represent the effective limits of the spreading and these are thus utilized to show the operation of the various optical elements.

The particular optical array 34 illustrated in FIG. 2 includes a first plano-convex cylindrical lens 56, a second plano-convex cylindrical lens 58, a third plano-convex cylindrical lens 60, a fourth plano-convex cylindrical lens 62 and a rectangular stop 64. The first, second and fourth plano-convex cylindrical lenses 58, 60 and 62 are substantially identical in construction in the preferred embodiment illustrated in FIG. 2 and are selected to have a 50 millimeter effective focal length (EFL). The third plano-convex cylindrical lens 60 is a thicker version is selected to have a 40 millimeter EFL. The transverse windows 22 of the dye laser amplifier 12 are presumed to be optically clear and do not constitute a portion of the optical element array. However the thickness of the transverse window 22 along the Y axis must be taken into account in determining the refraction characteristics of the various optical elements, since physical proximity of the optical array 34 to the lasing zone 18 is limited thereby.

In the optical array 34 of FIG. 2, the first and second plano-convex cylindrical lenses 56 and 58 are arrayed with their planar sides directed toward the proximal ends 42 of the optical fiber 38. The third and fourth plano-convex cylindrical lenses 60 and 62 and arrayed with their convex faces directed toward the optical fiber 38. The rectangular stop 64 is placed intermediate the second plano-convex cylindrical lens 58 and the third plano-convex cylindrical lens 60 and does not serve a specific beam shaping purpose except to control spherical aberration. Any excess spherical aberration in the transverse energy beam array 36 might do damage to components within the system. In particular, in the preferred embodiment, flexible seals utilized in the pressure containment vessels are subject to degradation if impacted by direct laser energy. For this reason, the rectangular stop 64 is utilized to prevent stray energy from impacting these elements.

The illustration of FIG. 3, showing the same arrangements as illustrated in FIG. 2, shows the rationale for the selection of cylindrical lens elements 56, 58, 60 and 62. That is, although the cylindrical lens elements operate to shape the transverse energy beam array 36 in the vertical (Z) dimension, as illustrated in FIG. 2, they are completely planar with respect to the X dimension (as shown in FIG. 3) so no horizontal shaping occurs. The transverse energy beam array 36 is allowed to spread in the X-Y plane so as to achieve an illumination bar 54 which has a horizontal width (X axis) equivalent to the length (X axis) of the lasing zone 18. The dimensions of the lasing zone 18 will vary, depending on the size and power handling capabilities of the dye laser amplifier. In the preferred embodiment, the illumination bar 54 and the lasing zone 18 have an X axis dimension of approximately 20 millimeters while each has a Z axis height of about 1.0 millimeters. The Y dimension of the lasing zone 18 is about 1.0 millimeters (due to the shapes of the end windows 20, etc.), while the illumination bar 54 may have a larger Y dimension, depending upon the optical array 34. Although some of the example rays 52 impact the dye stream 14 at oblique angles, as opposed to orthogonally, it has not been found that this slight angling results in any degradation of performance.

As is illustrated in FIG. 3, the three optical fibers 38 which are selected for illustrative purposes have the proximal ends 42 thereof spaced and angled in such a manner that the effective spread of the example rays 52 as they pass through the relay 32 and the transverse window 22 is such as to result in an effective illumination width corresponding to the width of the lasing zone 18. Although the three-fiber array 30 illustrated herein has the proximal ends 42 spaced apart, the precise geometry for optimum effect may have the ends abutting. The spacing shown is for illustrative purposes. Further, the spacing is such that approximately uniform illumination results across the entire width of the illumination bar 54, so that essentially equal transverse energy delivery is made to the entire lasing zone 18.

In the illustration of FIG. 3, only three optical fibers 38 are utilized. This is sufficient for purposes in which a moderate amount of enhancement is desired. When this small of a number of fibers are utilized there is no need to horizontally shape the transverse energy beam array 36 since the consequent spreading from the angling of the optical fibers 38 results in the appropriate width illumination bar 54 having the energy concentration desired.

Figure 4:
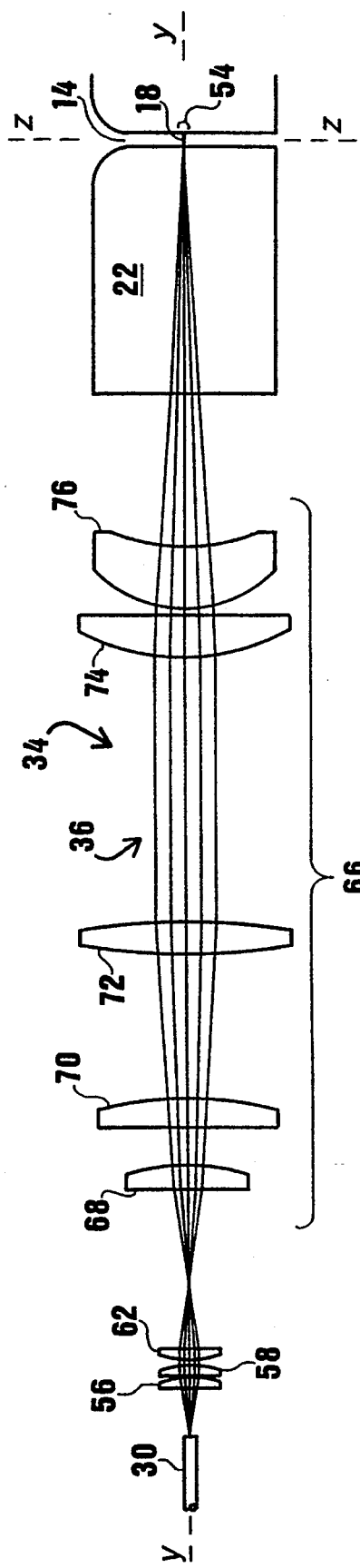
FIG. 4 is a Y-Z plane cross-sectional view of the preferred embodiment of a single relay structure as illustrated in FIG. 1.
Figure 5:
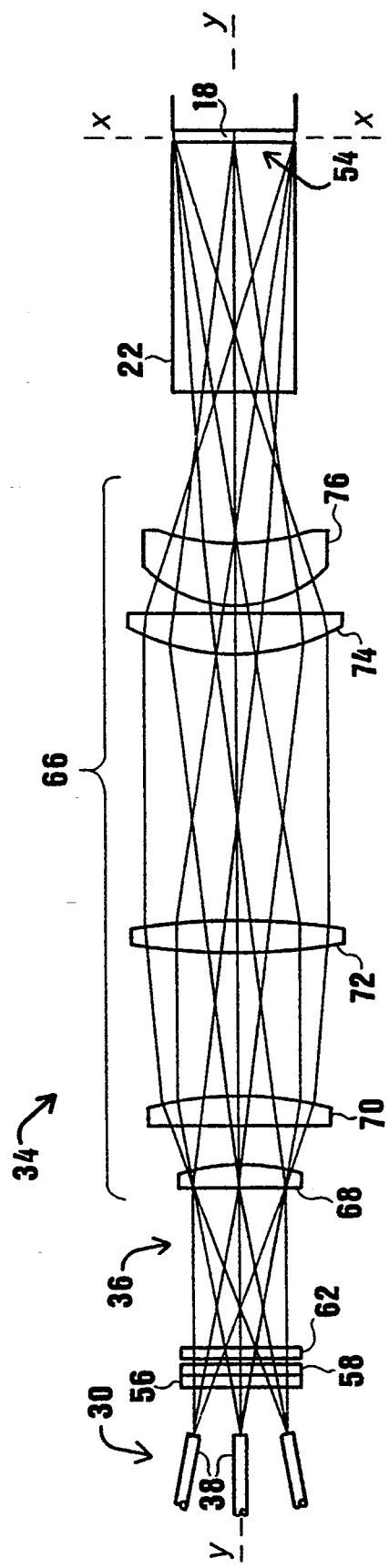
FIG. 5 is a X-Y plane cross-sectional view of the preferred relay structure illustrated in FIG. 4.

However, in the preferred embodiment, as illustrated in FIGS. 1, 4 and 5, a greater degree of transverse energy input is desired and it is necessary to use a larger number of optical fibers 38. For the eighteen-fiber array 30 illustrated in FIG. 1, additional components are required in the optical element array 34 in order to horizontally as well as vertically shape the transverse energy beam array 36 in order to achieve a usable illumination bar 54.

FIG. 4 is an illustration, similar to that of FIG. 2, showing the manner in which the components of the optical element array 34 are situated with respect to an eighteen-fiber optical fiber array 30. Although the illustration of FIG. 5, corresponding to that of FIG. 3, illustrates only three of the actual fibers 38, it is understood that these are the outermost fibers 38 (with the central fiber) and that any additional fibers occurring intermediate these would be directed in a similar manner. As is clear from a review of FIG. 5, the outermost fibers illustrated are angled at much greater degree than the outermost fibers illustrated in FIG. 3.

The optical components appearing at the extreme left of FIGS. 4 and 5 are cylindrical elements very similar in structure and purpose to those illustrated in FIGS. 2 and 3. However, the degree of focusing in the Z direction is slightly different so there is no need for the slightly thicker third plano-convex cylindrical lens 60. The first, second and fourth plano-convex cylindrical lenses 56, 58 and 62 appear in approximately the same locations in the array of FIGS. 4 and 5 as they do in FIGS. 2 and 3.

The multiplicity of optical fibers 38 utilized in the horizontal fiber array 30 illustrated in FIG. 5 requires horizontal as well as vertical shaping of the transverse energy beam array 36. For this purpose an additional combination optical component, referred to as a spherical telescope 66, is inserted. The spherical telescope 66 is utilized to narrow, focus and uniformly distribute the transverse energy in the horizontal dimension while reimaging and slightly demagnifying the transverse energy in the vertical dimension. Again, the particular choice of elements and the spacing thereof is determined by conventional optical principles available to those skilled in the art.

In the particular spherical telescope 66 illustrated in FIGS. 4 and 5 the components utilized are five distinct lens elements, each of which is radially symmetrical. The components utilized in this construction are a first plano-convex spherical lens 68, a second plano-convex spherical lens 70, a convex spherical lens 72, a third plano-convex spherical lens 74 and a thick meniscus 76. These optical components of the spherical telescope 66 act upon the more complex transverse energy beam array 36 created by the larger number of optical fibers 38 to result in essentially the same illumination bar 54 as is discussed with respect to FIGS. 2 and 3, with the only significant difference in the illumination bar 54 being the ultimate intensity of the energy, due to the increased input. In actuality, the result of the shaping of the optical telescope is an elongated ellipse, but the amount of energy delivered to areas beyond the lasing zone 18 is small enough to be disregarded. As is especially evident from FIG. 5, the optical shaping of the transverse energy beam 36, particularly in the horizontal dimension, to form the illumination bar 54 is quite complex. However, it is well within the scope of the skill of those skilled in the optical sciences.

The particular arrangements of the optical element arrays 34 illustrated herein has been found to be appropriate for the usages envisioned by the inventors. However, it is understood that a wide variety of other arrangements may also result in a similar shaping of the transverse energy beam array 36 to achieve a desired shape and uniformity of an illumination bar 54. Further, the number of optical fibers 38 is adjustable at the discretion of the user and, with improving technology, may be increased beyond the maximum currently available.

In addition, although the optical fiber arrays 30 illustrated herein have utilized co-planar configurations of the individual optical fibers 38, this is not a requirement for the primary purposes of the invention. For some dye laser systems, it is envisioned that circular arrays and other symmetrical arrays may be created which will yield similar results, albeit with different optical configurations. For example, a double or triple row array of optical fibers 38 would certainly be amenable for optical shaping into a similar sort of illumination bar to that which is produced by the optics illustrated in the present application.

All of the above are only some of the examples of the available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The interface module for transverse energy input to dye laser modules 10, according to the current invention, is intended for primary industrial utility with respect to dye laser equipment and particular dye laser amplifiers 12. The expected primary usage is in the field of fiber to amplifier relay structures (FTAR's) wherein transverse enhancement energy is delivered to the dye stream 14 of a dye laser amplifier structure 12.

The dye laser amplifier structure 12 which are enhanced by incorporation of the present invention are expected to be utilized in a variety of circumstances in which high power coherent electromagnetic energy sources are desired. It is especially important in the fields of particle physics and materials formation. The primary present use is in research applications and in the generation of laser energy to be used for isotope separation purposes.

Due to the improved results of the present invention in concentrating transverse energy upon the lasing zone 18 of a dye laser 12 and due to the advantages obtained by delivery of relatively uniform illumination across the illumination bar 54, it is expected that interface modules 10 according to the present invention will demonstrate applicability and utility which is both wide spread in scope and long lasting in duration.

We claim:

1. An interface module for use in inputting transverse electromagnetic beam energy to a dye laser component having excitable dye molecules situated within a lasing zone therein, comprising:
    a plurality of optical fibers, each of said fibers having a proximal and a distal end, said proximal end of each of said fibers disposed proximate to a lasing zone of a dye laser component each of said fibers having an associated energy beam source for generating energy suitable for pumping dye molecules of said dye laser component situated proximate to said distal end such that said energy generated by said energy beam source is delivered by each of said fibers in substantially the form of a coherent beam from said proximal end of each said fibers in a direction substantially transverse to said lasing zone; and
    a plurality of optical shaping elements, said optical shaping elements formed into an optical element array, said optical shaping elements working in conjunction with each other to direct said energy delivered by each of said optical fibers into an elongated broad beam, a portion of said broad beam forming an illumination bar, said illumination bar having a substantially uniform intensity over a zone in the shape of a rectangular solid, said optical element array being positioned and configured such that said illumination bar coincides with said lasing zone of said dye laser component.

2. The interface module of claim 1 wherein
    said lasing zone has a elongated rectangular transverse cross section and said optical fibers are arrayed so as to be coplanar.

3. The interface module of claim 1 wherein
    said proximal ends of said optical fibers are held in a relay structure secured in transverse juxtaposition to said dye laser component, said relay structure securing and positioning said fibers such that said proximal ends thereof are directed at a single point.

4. The interface module of claim 3 wherein the relay structure includes
    a relay housing including a plurality of fiber entry apertures situated on the side of the relay housing opposite the dye laser component, each of said fiber entry apertures configured to receive one of said optical fibers.

5. The interface module of claim 4 wherein p1 the relay housing is formed of a pair of opposing mounting plates secured vertically together, with said optical fibers disposed therebetween.

6. The interface module of claim 1 wherein said fibers are arrayed such that the outermost fibers of said array have their proximal ends directed at a relative angle of no greater than 20 degrees.

7. The interface module of claim 1 wherein said optical element array includes a plurality of cylindrical optical elements for vertically configuring said energy delivered by each of said fibers, while having minimal effect on the horizontal configuration of said energy delivered by each of said fibers.

8. The interface module of claim 1 wherein said optical element array includes a spherical telescope for sharing said energy delivered by each of said fibers both vertically and horizontally to form said illumination bar.

9. In a device for delivering concentrated electromagnetic energy to a zone having an elongated rectangular transverse cross section, the improvement comprising:

a plurality of optical fibers each of said fibers having a proximal and a distal end with said proximal ends thereof being formed into a substantially coplanar array, said proximal ends being aligned so as to be convergingly directed, said proximal ends disposed adjacent to a zone having an elongated rectangular transverse cross section;

energy source means for delivering energy to said distal end of each of said optical fibers such that said energy received by each of said fibers is delivered as an output beam in substantially coherent form from said proximal ends of each of said fibers; and output shaping means coupled to each of said output beams delivered in substantially coherent form from said proximal ends of each of said fibers for forming an illumination bar having a transverse cross sectional shape in the form of an elongated rectangle, said illumination bar having substantially uniform energy intensity.

10. The improvement of claim 9 wherein said optical fibers are disposed in a coplanar array in the plane of the major axis of said elongated rectangular cross section.

11. The improvement of claim 9 wherein said output beams delivered from each of said proximal ends of said optical fibers are aimed at a common point.

12. The improvement of claim 9 wherein said output shaping means includes a plurality of optical lens components, at least some of said optical lens components are cylindrical.

13. The improvement of claim 9 wherein said optical shaping means includes a spherical telescope.

14. The improvement of claim 9 wherein said plurality of optical fibers is held in position by a relay structure situated in transverse juxtaposition to said zone.

15. A fiber optic relay structure for use with a dye laser amplifier having excitable dye molecules passing through a lasing zone therein, the lasing zone being spatially bounded by a pair of opposing optically clear end windows and a pair of optically clear transverse windows, the dye laser amplifier receiving an axial input beam passing through the lasing zone, the amplifier including means for generating an enhanced output beam continuing in the direction of the input beam, the fiber optic relay structure comprising:

a relay housing situated adjacent to a pair of optically clear transverse windows spatially bounding a lasing zone of a dye laser amplifier;

an optical fiber array including a plurality of optical fibers each of said fibers having a proximal and a distal end, said proximal end of each said optical fibers secured within said relay housing, said distal end of each of said optical fibers coupled to an energy source, said energy source having means for producing dye molecule excitation energy, said dye molecule excitation energy directed through each of said optical fibers such that said dye molecule excitation energy emerges at said proximal end thereof as a fiber output beam;

an optical shaping array including a plurality of optical components, said optical shaping array operating on each of said fiber output beams to form a focused beam, said focused beam including an illumination bar segment having substantially uniform intensity in a three dimensional volume corresponding to said lasing zone.

16. The fiber optic relay structure of claim 15 wherein said optical fiber array is situated such that said optical fibers are held with said proximal ends thereof coplanar with a plane corresponding to the major axis of lasing zone; and said proximal ends of said optical fibers are convergingly angled so as to be directed at a common point.

17. The fiber optic relay structure of claim 15 wherein said relay housing includes a pair of vertically opposing mounting plates for retaining said proximal end of each of said optical fibers therebetween.

18. The fiber optic relay structure of claim 15 wherein said lasing zone has a rectangular transverse cross section and said optical shaping array includes cylindrical optical elements adapted to form said illumination bar to have a transverse cross section substantially congruent with that of lasing zone at the interface between said illumination bar and said lasing zone.

19. The fiber optic relay structure of claim 15 wherein said optical fiber array is formed such that outermost fibers thereof are aimed such that said fiber output beams corresponding thereto are aimed at a position at an opposing end of said transverse lasing windows.

20. The fiber optic relay structure of claim 15 wherein said optical shaping array includes a spherical telescope.

* * * * *